United States Patent [19]

Naef et al.

[11] Patent Number: 5,391,762

[45] Date of Patent: Feb. 21, 1995

[54] NIR DYES, METHODS OF PREPARING THEM AND THEIR USE

[75] Inventors: Rudolf Naef, Lupsingen; Beat Schmidhalter, Oberkirch; Hanspeter Preiswerk, Birsfelden, all of Switzerland

[73] Assignee: Ciba-Geigy Corporation, Ardsley, N.Y.

[21] Appl. No.: 121,018

[22] Filed: Sep. 14, 1993

Related U.S. Application Data

[62] Division of Ser. No. 967,078, Oct. 26, 1992, Pat. No. 5,266,699.

[30] Foreign Application Priority Data

Oct. 30, 1991 [CH] Switzerland .......................... 3168/91

[51] Int. Cl.⁶ .................. C07D 221/18; C07D 221/06
[52] U.S. Cl. ...................... 548/455; 544/101; 546/61; 546/84; 546/273; 546/345
[58] Field of Search .................. 548/455; 546/71, 84, 546/273, 345; 544/101

[56] References Cited

U.S. PATENT DOCUMENTS

| | | | |
|---|---|---|---|
| 3,527,517 | 9/1970 | Hackmann et al. | 548/455 |
| 3,580,911 | 5/1971 | Mee et al. | 546/273 |
| 4,072,690 | 2/1978 | Garner et al. | 546/273 |
| 4,257,954 | 3/1981 | Schmidt et al. | 546/273 |
| 4,767,693 | 8/1988 | Oba et al. | 548/455 |
| 4,847,385 | 7/1989 | Kusakata et al. | 548/455 |
| 4,876,357 | 10/1989 | Phaff et al. | 548/463 |
| 5,004,813 | 4/1991 | Phaff et al. | 548/463 |
| 5,071,986 | 12/1991 | Phaff et al. | 546/116 |
| 5,144,333 | 9/1992 | Mizuguchi et al. | 346/1.1 |
| 5,266,699 | 10/1992 | Naef et al. | 546/61 |

FOREIGN PATENT DOCUMENTS 2163863  3/1986  United Kingdom .

OTHER PUBLICATIONS

Chem. Abstr. 90, 732286r (1979).
Derw. Abst. 86–328264[50] (1986).
Derw. Abst. 88–290161[41] (1988).

Primary Examiner—Johann Richter
Assistant Examiner—John Peabody
Attorney, Agent, or Firm—George R. Dohmann

[57] ABSTRACT

The compounds of the formula I

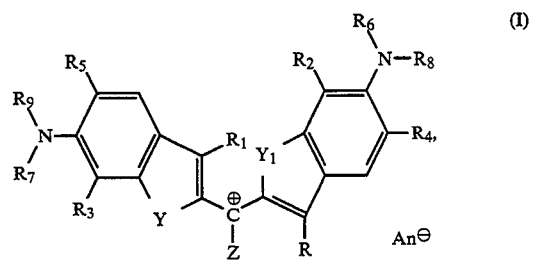

in which

Y and $Y_1$ are each, independently of one another, O, S, NH or N-alkyl, N-cycloalkyl, N-phenyl or N-benzyl, or Y and $Y_1$ are together N-alkylene-N, R and $R_1$ are each, independently of one another, H, alkyl, cycloalkyl, aralkyl or aryl, $R_2$ and $R_3$ are each, independently of one another, H, or $R_2$ forms, together with $R_6$ and the N and C atoms linking them, a 5- or 6-membered ring and $R_3$ is H, or $R_3$ forms, together with $R_7$ and the N and C atoms linking them, a 5- or 6-membered ring and $R_2$ is H, $R_4$ and $R_5$ are each, independently of one another, H, $R_4$ forms, together with $R_8$ and the N and C atoms linking them, a 5- or 6-membered ring and $R_5$ is H, or $R_5$ forms, together with $R_9$ and the N and C atoms linking them, a 5- or 6-membered ring and $R_4$ is H, $R_6$, $R_7$, $R_8$ and $R_9$ are each, independently of one another, H, alkyl, cycloalkyl, aralkyl or aryl, or $R_6$ and $R_8$ and/or $R_7$ and $R_9$ form, together with the N atom linking them, a piperidine radical, a morpholine radical or an unsubstituted piperazine radical or a piperazine radical substituted on the N atom by $C_1$-$C_4$alkyl, hydroxyl-$C_1$-$C_4$alkyl or amino-$C_1$-$C_4$alkyl, Z is H or aryl and (Abstract continued on next page.)

Abstract-continued $An^\ominus$ is an anion of a monobasic acid, the alkyl or cycloalkyl being unsubstituted or substituted by halogen, hydroxyl, $C_1$-$C_4$alkoxy, cyano or phenyl, and the aryl or aralkyl being unsubstituted or substituted by halogen, hydroxyl, NH-alkyl, N(alkyl)$_2$, $C_1$-$C_6$alkyl, $C_1$-$C_4$alkoxy, carboxyl, alkoxycarbonyl, carbonamido, mono- or dialkylcarbonamido, nitro or CN, are suitable as light-absorbing substances in optical recording media.

7 Claims, No Drawings

NIR DYES, METHODS OF PREPARING THEM AND THEIR USE

This is a divisional of Ser. No. 07/967,078, filed Oct. 26, 1992, now U.S. Pat. No. 5,266,699.

The present invention relates to novel NIP, dyes, methods of preparing them, intermediates, and their use as NIR-absorbing substances in optical recording media. The compounds according to the invention are those of the formula I

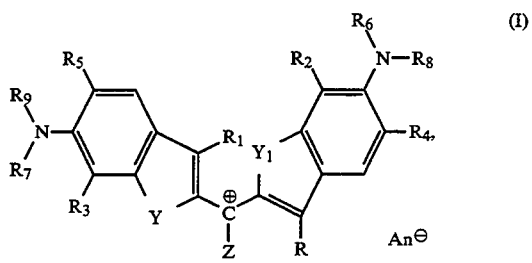

in which

Y and $Y_1$ are each, independently of one another, O, S, NH or N-alkyl, N-cycloalkyl, N-phenyl or N-benzyl, or Y and $Y_1$ are together N-alkylene-N, R and $R_1$ are each, independently of one another, H, alkyl, cycloalkyl, aralkyl or aryl, $R_2$ and $R_3$ are each, independently of one another, H, or $R_2$ forms, together with $R_6$ and the N and C atoms linking them, a 5- or 6-membered ring and $R_3$ is H, or $R_3$ forms, together with $R_7$ and the N and C atoms linking them, a 5- or 6-membered ring and $R_2$ is H, $R_4$ and $R_5$ are each, independently of one another, H, $R_4$ forms, together with $R_8$ and the N and C atoms linking them, a 5- or 6-membered ring and $R_5$ is H, or $R_5$ forms, together with $R_9$ and the N and C atoms linking them, a 5- or 6-membered ring and $R_4$ is H, $R_6$, $R_7$, $R_8$ and $R_9$ are each, independently of one another, H, alkyl, cycloalkyl, aralkyl or aryl, or $R_6$ and $R_8$ and/or $R_7$ and $R_9$ form, together with the N atom linking them, a piperidine radical, a morpholine radical or an unsubstituted piperazine radical or a piperazine radical substituted on the N atom by $C_1$-$C_4$alkyl, hydroxyl-$C_1$-$C_4$alkyl or amino-$C_1$-$C_4$alkyl, Z is H or aryl and $An^\ominus$ is an anion of a monobasic acid, the alkyl or cycloalkyl being unsubstituted or substituted by halogen, hydroxyl, $C_1$-$C_4$alkoxy, cyano or phenyl, and the aryl or aralkyl being unsubstituted or substituted by halogen, hydroxyl, NH-alkyl, N(alkyl)$_2$, $C_1$-$C_6$alkyl, $C_1$-$C_4$alkoxy, carboxyl, alkoxycarbonyl, carbonamido, mono- or dialkylcarbonamido, nitro or CN.

According to the invention, alkyl radicals are generally to be understood as meaning straight-chain or branched alkyl groups. These are, for example, methyl, ethyl, propyl, isopropyl, butyl, isobutyl, tert-butyl, amyl, tert-amyl, (1,1-dimethylpropyl), 1,1,3,3-tetramethylbutyl, hexyl, 1-methylpentyl, neopentyl, 1-, 2- or 3-methylhexyl, heptyl, n-octyl, tert-octyl, 2-ethylhexyl, n-nonyl, isononyl, decyl, dodecyl, and the other isomers associated therewith. The alkyl radicals preferably contain 1 to 6 C atoms, in particular 1 to 4 C atoms. Said alkyl radicals may be substituted, for example by halogen, hydroxyl, alkoxy, cyano or phenyl. Suitable alkoxy radicals are those containing 1-4 C atoms, for example methoxy, ethoxy, propoxy, isopropoxy, n-butoxy, isobutoxy or tert-butoxy. In this application, halogen is generally to be understood as meaning fluorine, bromine, iodine or, in particular, chlorine. Examples of such substituted alkyl radicals are hydroxyethyl, methoxymethyl, ethoxyethyl, cyanoethyl, propoxypropyl, benzyl, chloroethyl or cyanoethoxyethyl.

Within the scope of this application, cycloalkyl is understood as meaning, for example, cyclopentyl and cyclohexyl. The cycloalkyl may be unsubstituted or substituted by substituents as defined above for alkyl.

The aryl radicals Z may be aromatic carbocyclic or heterocyclic radicals, in particular mono- or bicyclic radicals. These are, for example, phenyl, 1-naphthyl, 2-naphthyl, 2-pyridyl, 3-pyridyl, 4-pyridyl, furyl, pyrrolyl, imidazolyl, 2-pyrimidyl, 2-thienyl, oxazolyl, cumaryl, indolyl, quinolinyl, isoquinolinyl, benzofuryl, benzothienyl, benzoxazolyl or benzimidazolyl.

As aryl, $R_1$, $R_2$, $R_6$, $R_7$, $R_8$ and $R_9$ are preferably phenyl.

Within the scope of the invention, aralkyl is preferably benzyl.

The aryl radicals and the aralkyl may be substituted, for example by halogen, hydroxyl, NH-alkyl, N(alkyl)$_2$, $C_1$-$C_6$alkyl, $C_1$-$C_4$alkoxy, carboxyl, alkoxycarbonyl, carbonamido, mono- or dialkylcarbonamido, nitro or CN.

If Y and $Y_1$ are together a group of the formula N-alkylene-N, alkylene is preferably a group having the formula $-[C(R_{10})_2]_m-$, where $R_{10}$ is H or alkyl and m is 1, 2 or 3. $R_{10}$ is preferably H.

$R_6$ and $R_8$ and/or $R_7$ and $R_9$ may also form, together with the N atom linking them, a piperidine, morpholine or piperazine radical. The piperazine radical may be substituted on the N atom not linked to the triazine ring by $C_1$-$C_4$alkyl or hydroxyl-$C_1$-$C_4$alkyl or amino-$C_1$-$C_4$alkyl. Preferred substituents are linear $C_1$-$C_4$alkyl, in particular methyl and ethyl.

Just like $R_4$ and $R_8$, $R_3$ and $R_7$, and $R_5$ and $R_9$, $R_2$ and $R_6$ may form, together with the nitrogen atom and the two carbon atoms linking them, a 5- or 6-membered ring, which may contain a further hetero atom, for example oxygen or sulfur. In addition, the ring may be substituted, for example by hydroxyl, alkoxy, alkyl, halogen, CN or phenyl, or it may carry a further fused-on benzene ring. Preferred rings of this type are dihydrooxazine rings and di- or tetrahydropytidine rings which are unsubstituted or substituted by 1 to 4 methyl groups.

In particularly valuable dyes of the formula (I), R and $R_1$ are each, independently of one another, H or an unsubstituted $C_1$-$C_4$alkyl radical, in particular methyl.

$R_2$ and $R_3$ are each, independently of one another, preferably H or, together with $R_6$ and $R_7$, respectively, they are trimethylene.

$R_4$ and $R_5$ are each, independently of one another, preferably H or, together with $R_8$ and $R_9$, respectively, they are trimethylene or 1,1-dimethyl-3-methyltrimethylene.

$R_6$, $R_7$, $R_8$ and $R_9$ are each, independently of one another, preferably H, $C_1$-$C_4$alkyl or, if desired, phenyl substituted as defined above.

Y and $Y_1$ are each, independently of one another, preferably O, NH or NH-$C_1$-$C_4$alkyl.

Z is preferably H or a substituted or unsubstituted phenyl, naphthyl, pyridyl, furyl, thienyl or pyrrolyl radical. In particularly preferred dyes of the formula (I), Z is H, unsubstituted pyridyl or furyl or unsubstituted phenyl or phenyl substituted by nitro, mono- or dialkylamino, hydroxyl, carboxyl or caxboalkoxy.

According to the invention, the anion $An^\ominus$ may be derived from an inorganic or organic acid. Examples of inorganic anions are $F^\ominus$, $Cl^\ominus$, $Br^\ominus$, $I^\ominus$, $ClO_4^\ominus$, $BrO_4^\ominus$, $IO_4^\ominus$, $NO_3^\ominus$, $HSO_4^\ominus$, $HCO_3^\ominus$, $C_1\text{-}C_{12}\text{alkylOSO}_3^\ominus$, $C_6H_5OSO_3^\ominus$, $BF_4^\ominus$, $PF_6^\ominus$, $AsF_6^\ominus$, $SbF_6^\ominus$, $BiF_6^\ominus$, $SbCl_6^\ominus$, $(C_1\text{-}C_4\text{alkylO})_2PO_2^\ominus$, $(C_1\text{-}C_4\text{alkylO})_2PO^\ominus$, $(C_1\text{-}C_4\text{alkylO})_2R_{11}PO^\ominus$, $FSO_3^\ominus$, $(C_1\text{-}C_4\text{alkylO})R_{11}PO^\ominus$, $R_{11}SO_3^\ominus$, $R_{11}CO_2^\ominus$, where $R_{11}$ is H, $C_1\text{-}C_{12}$alkyl, which may be partially or completely substituted by F or Cl, $C_4\text{-}C_8$cycloalkyl, phenyl, naphthyl or phenyl or naphthyl substituted by 1 to 3 F, Cl, $C_1\text{-}C_6$alkyl or $C_1\text{-}C_6$alkoxy. Particularly preferred anions $An^\ominus$ are $Cl^\ominus$, $Br^\ominus$, $ClO_4^\ominus$, $C_1\text{-}C_6\text{alkylOSO}_3^\ominus$, $FSO_3^\ominus$ and $R_{11}SO_3^\ominus$, in which $R_{11}$ is $C_1\text{-}C_4$alkyl, $CF_3$, phenyl or phenyl substituted by 1 to 3 F, Cl or $C_1\text{-}C_4$alkyl.

The dyes according to the invention of formula (I) in which Z is hydrogen are prepared, for example, by reacting a compound of the formula II

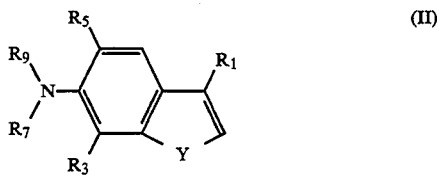

with an orthoformate in the presence of a strong acid. In this connection, Y, $R_1$, $R_3$, $R_5$, $R_7$ and $R_9$ are as defined under the formula (I).

The orthoformates used are preferably those of the formula $HC(O\text{-}C_1\text{-}C_6\text{alkyl})_3$, for example methyl or ethyl orthoformate.

The strong acid used is, for example, 100% sulfuric acid or toluenesulfonic acid monohydrate. The orthoformate is expediently used in excess, so that it also acts as a solvent. Elevated temperture, for example 50° to 120° C., is preferably employed.

A further possible method of preparing the dyes of the formula (I) is one wherein a compound of the formula III

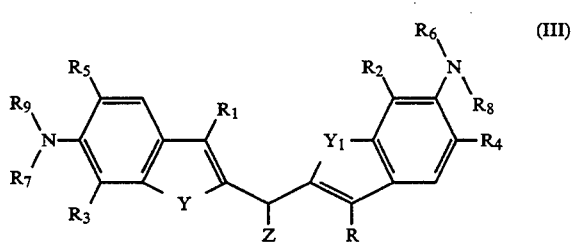

is oxidised using an oxidising agent, where Y, $Y_1$, Z, R and $R_1$ to $R_9$ are as defined under the formula (I).

Suitable oxidising agents am, for example, iodine, chloranil (tetrachlorobenzoquinone), $H_2O_2$ or, in particular iron(Ill) chloride.

The compounds of the formula (III) are novel and are a further subject of the present invention.

They are obtained, for example, by reacting a compound of the formula (II) with an aldehyde of the formula (IV)

where Z is as defined under formula (I).

The reaction is preferably carded out in an organic solvent, for example an aliphatic alcohol, and at a slightly elevated temperature, for example between 25° and 80° C., and the components are preferably used in approximately stoichiometric quantities.

The compounds of the formulae (II) and (IV) are known or can be prepared in a manner known per se.

The compounds according to the invention of the formula (I) have, surprisingly, a wide and strong absorption band extending from the visible up into the near infrared region (NIR region) in the wavelength region from approximately 400 nm up to approximately 1000 nm. They are therefore particularly suitable for use as light-absorbing substances in optical recording media.

The invention further relates to an optical recording material comprising. (a) a solid base material on which (b) a recording layer composed of at least one compound of the formula I is deposited.

The structure of the recording material is known per se.

Suitable bases are, for example, metals, metal alloys, glasses, minerals, ceramics, metal and semi-metal oxides, metal and semi-metal carbides and metal and semi-metal nitrides, and thermosetting or thermoplastic polymeric materials. The base may have a thickness of 0.01 mm to 1 cm, preferably 0.1 mm to 0.5 cm. Preferred bases are glasses and homopolymeric or copolymeric materials. Suitable polymeric materials are, for example, thermoplastic polycarbonates, polyamides, polyesters, polyacrylates and polymethacrylates, polyurethanes, polyoleflns, polyvinyl chloride, polyvinylidene fluoride, polyimides, thermosetting polyesters and epoxy resins. Depending on the recording and read-out method, the base material may be opaque (irradiation from the recording layer side) or transparent (irradiation from the base material side). The base material is chosen in such a way that it is not destroyed during the coating process. Solvent-sensitive base materials may be provided before coating with a solvent-resistant priming layer, which may have, for example, a thickness of 0.05 to 30 $\mu$m and, preferably, 0.1 to 10 $\mu$m. Suitable materials for a priming layer are, for example, ionomer resins, silicates, $SiO_2$, $MgF_2$, $TiO_2$, TiN, $Si_3N_4$, vinyl monomer resins and silicone resins.

The thickness of the recording layer is chosen so as to ensure a reflectivity of at least 15% in the wavelength region of the laser used. The thickness may be, for example, from 10 nm to 10 $\mu$m, preferably 20 nm to 2 $\mu$m.

One or more, for example 1 to 10, preferably 1 to 5 and particularly preferably 1 to 3, layers of compounds of the formula I may be deposited on the base. The number of the layers and further layers depends mainly on the optical density of the layer structure, which also has to ensure an adequate transmission at the wavelength used for recording. Deposited on the layer composed of compounds of formula I or on the base may be a reflective layer, which may have a thickness of, for example, 100 to 5000 Å, preferably 100 to 3000 Å and, in particular, from 300 to 1500 Å. Suitable reflecting materials are, in particular, metals which reflect the laser radiation used for recording and reproduction well, for example the metals of the third, fourth and fifth main groups and the subgroups of the Periodic System of the Chemical Elements. Particularly suitable are Al, In, Sn, Pb, Sb, Bi, Cu, Ag, Au, Zn, Cd, Hg, So, Y, La, Ti, Zr, Hf, V, Nb, Ta, Cr, Mo, W, Fe, Co, Ni, Ru, Rh, Pal, Os, Ir, Pt and the lanthanide metals Ce, Pr, Nd, Pm, Sm, Eu, Gd, Tb, Dy, HO, Er, Tm, Yb and Lu. For reasons of high reflectivity and easy manufacturability, a reflective layer composed of aluminium or gold is particularly preferred. If the recording media according to the invention contain a ligh-reflecting layer so that the incident light travelling through the coloured layer (provided it is not absorbed) is reflected at the reflective layer and travels through the dyed layer yet again, it is advantageous to give the dye layer in such cases a thickness of $\lambda/4$ ($\lambda$=wavelength of incident light) since a particularly high utilisation (attenuation) of the incident light is then reached as a result of interference. If dyes according to the invention are used, however, very sensitive recording media are obtained even with layer thicknesses which are markedly less than $\lambda/4$ which is surprising.

In a further embodiment, the recording layer may additionally contain a thermoplastic binder, for example polystyrene, polyvinyl acetate, polyvinylpyrrolidone, cellulose acetate butyrate, polysulfonamide, polycarbonate or cellulose nitrate.

The layer which is uppermost depending on the layer structure, for example the reflective layer, the recording layer or a further auxiliary layer, is expediently provided with a protective layer, which may have a thickness of 0.1 to 100 $\mu$m, preferably 0.1 to 50 $\mu$m and, particularly preferably, 0.5 to 15 $\mu$m. Suitable as protective material are, in particular, polymeric materials which are applied to the base or the uppermost layer as a thin layer, either directly or with the aid of adhesive layers. Mechanically and thermally stable polymeric materials which have good surface properties and which can also be modified, for example written on, are expediently chosen. These may be either thermosetting or thermoplastic polymeric materials. Preferred are radiation-cured (for example with UV radiation) protective layers, which can be prepared particularly simply and economically. Radiation-curable materials are known in a large multiplicity. Examples of radiation-curable monomers and oligomers are acrylates and methacrylates of diols, triols and tetrols, polyimides of aromatic tetracarboxylic acids and aromatic diamines containing $C_1$-$C_4$alkyl groups in at least two ortho positions of the amino groups, and oligomers containing dialkylmaleimidyl, for example dimethylmaleimidyl groups. Specific examples are UV-crosslinkable polymers based on polyacrylates, for example REN-GOLUX® RZ 3200/003 or 3203/001 supplied by the Morion International-Dr. Renger company.

The recording materials according to the invention can be prepared by methods known per se, and various coating methods may be used, depending on materials used and their mode of operation.

Suitable coating methods are, for example, immersion, casting, spreading, doctor-blading, spin-casting and vapour-coating processes carried out in high vacuum. If casting processes are used, for example, solutions in organic solvents are generally used. If solvents are used, steps must be taken to ensure that the bases used are insensitive to said solvents. Preferably, all the layers are prepared by vapour-coating methods, in particular in vacuo. Suitable coating methods are described, for example, in EP-A-0 401 791.

The recording layer(s) and the metallic reflective layers are preferably deposited by vapour-coating in vacuo. The material to be deposited is first poured into a suitable vessel, which is provided, if desired, with a resistance heater, and then placed in a vacuum chamber. The base to be vapour-coated is inserted in a holder above the vessel containing the material to be vaporised. Said holder is constructed in such a manner that the base can be rotated (for example at 50 rev/min), if desired, and heated. The vacuum chamber is evacuated to about $1.3 \cdot 10^{-5}$ to $1.3 \cdot 10^{-6}$ mbar ($10^{-5}$ to $10^{-6}$ torr), and the heating is adjusted so that the temperature of the material to be vaporised increases to its vaporisation temperature. The vaporisation is continued until the vapour-coated layer has the desired thickness. Depending on the system structure, the organic recording compound is deposited first, followed by the reflective layer, or the procedure may be reversed. The deposition of a reflective layer may, if desired, be dispensed with. This vapour-coating method is particularly suitable for the simultaneous deposition of dithioquinacridones and hydrazones to form homogeneous mixed layers.

The sputtering technique is preferred for the deposition of the metallic reflective layer, in particular, because of the high adhesion to the base. The material to be deposited (for example, aluminium) in the form of a plate is used as a "target" electrode, while the base is mounted on the counterelectrode. The vacuum chamber is first evacuated to approximately $10^{-6}$ tort and inert gas, for example argon, is then introduced to a pressure of approximately $10^{-3}$ torr. To generate $Ar^+$ plasma, a high direct voltage or a radio-frequency voltage of several kV is applied between the "target" electrode and the counterelectrode, using, if desired, permanent magnets ("magnetron sputtering"). The metal particles sputtered (dislodged) from the "target" electrode by the $Ar^+$ ions are uniformly and firmly deposited on the substrate. The coating takes place within a few tens of seconds to several minutes, depending on target materials, sputtering method and sputtering conditions. Said sputtering technique is described in detail in textbooks for example (W. Kern and L. Vossen, "Thin Film Processes", Academic Press, 1978).

The thickness of the layers formed during vapour coating can be monitored with the aid of known methods, for example with the aid of an optical system which measures, during the vapour coating, the reflectivity of the reflective surface covered with the absorption material. Preferably, the increase in layer thickness is tracked with the aid of a quartz oscillator.

Protective layers are preferably applied by means of lacquering installations ("spin coaters") and, if photosensitive materials are used, they are crosslinked using UV light.

The structure of the recording material according to the invention depends mainly on the read-out method; known principles of operation are the measurement of change in transmission or in reflection. If the recording material is based on the change in light transmission, the following structure, for example, is suitable: transparent base/recording layer (single-layer or multilayer) and, if expedient, transparent protective layer. The light for recording and for reading out may be irradiated either from the base side or the recording layer side or, if applicable, the protective layer side, the light detector always being located on the opposite side.

If the recording material is based on the change in reflection, the following different structures may, for example, be used: transparent base/recording layer (single-layer or multilayer)/reflective layer and, if expedient, protective layer (not necessarily transparent), or base (not necessarily transparent)/reflective layer/recording layer and, if expedient, transparent protective layer. In the first case, the light is radiated from the base side, whereas in the latter case the radiation is incident from the recording layer side or, if applicable, from the protective layer side. In both cases, the light detector is located on the same side as the light source. The first-mentioned structure of the recording material to be used according to the invention is generally preferred.

The recording material according to the invention is eminently suitable for recording information by irradiation with lasers from the visible region up to the NIR region. After irradiation, a markedly increased reflection or transmission of the laser light is observed. The change in the reflection or transmission can therefore be used to read out the information, and no destruction of the information written-in by the laser radiation used for reading out takes place. The information can therefore be read out repeatedly.

A particular advantage of the use of the compounds of the formula I as optical recording layer for information is the wide and strong absorption band from the visible up into the infrared region (wavelength region from 400 to 1000 nm). As a result it is possible to use for irradiation and information recording either lasers which emit in the wavelength region from 600 to 1060 nm [for example, diode lasers such as InGaAlP (680 nm), GaAlAs (780–880 nm) and GaAs (890–1060 nm)], or frequency-doubled semiconductor lasers which emit, for example, at 432 nm or 532 nm. The recording layers are furthermore remarkable for a high sensitivity. The recording layers furthermore have a surprisingly high complex refractive index $N=n+ik$ i.e. both a high refractive index n and a high absorption coefficient k. This produces a very high difference in contrast between written and unwritten areas of the layers.

A further subject is a method of optically recording and storing information in the form of bits, which comprises irradiating the recording layer of a recording material according to the invention with laser light having a wavelength of 400 to 1100 nm and reading out the recorded information at the same wavelength by measuring the difference in absorption with respect to the unirradiated surroundings.

Suitable lasers are, for example, commercial diode lasers, in particular semiconductor diode lasers, for example GaAsAl, InGaAlP or GaAs lasers having a wavelength of 780, 650 or 830 nm, respectively, or He/Ne lasers (633 nm) and argon lasers (514 nm). The recording can be carried out point by point with the aid of a light modulator.

The laser radiation energy used for recording may be, for example, from 0.1 to 10 nJ/mark (bit), preferably from 0.2 to 5 nJ/mark (bit) and, particularly preferably, 0.8 to 3 nJ/mark (bit). The amount of energy is essentially controlled by the irradiation time, for example by pulses in the region of a few tens to 100 nanoseconds.

The method according to the invention makes it possible to store information with a high reliability and durability, which manifest themselves through a very good mechanical and thermal stability and through a high light stability and sharp edge zones. Particularly advantageous is the surprisingly high signal/noise ratio of information mark base material, which permits perfect reading out. Furthermore, the optical recording system is simple and inexpensive.

The information is read out by measuring the absorption by the reflection method or transmission method using laser radiation, it being particularly advantageous that laser radiation of the wavelength used for recording can be used, that is to say a second laser does not have to be used. In a preferred embodiment, the information is recorded and read out at the same wavelength. During reading-out, use is generally made of low-energy lasers whose radiation intensity is reduced, for example, by a factor of 10 to 50 compared with the laser radiation used for recording. In the case of the recording material used according to the invention, the information can be read out once or repeatedly. The change in the absorption spectrum or the stored information can be read off with a photodetector using a low-energy laser. Suitable photodetectors include PIN photodiodes and microscope spectrophotometers, for example UMSP 80 supplied by Carl Zeiss, which make it possible to meausre the spectral changes by transmission or absorption and in particular reflection.

The invention furthermore relates to the use of compounds of the formula I as optical recording material.

The examples below serve to explain the invention.

A) Preparation Examples

Example 1:

a) In the course of 2 hours, 21.1 g of chloroacetone are added dropwise at 0–5° C. to a mixture of 31.2 g of N,N-diethyl-m-phenylenediamine, 28.9 g of potassium carbonate and 5.25 g of potassium iodide in 145 ml of dimethylformamide and stirring is then carried out for 15 hours at the same temperature. Addition of 500 ml of water results in 37 g of N,N-diethyl-N'-acetonyl-m-phenylenediamine in the form of a colourless product having a melting point of 60° C. after washing with water and drying in vacuo at 45° C.

b) An intimate mixture of 46.5 g of N,N-diethyl-N'-acetonyl-m-phenylenediamine and 46.5 g of zinc chloride is heated slowly, in which process it starts to melt from 70° C. upwards and from 115° C. upwards the exothermic reaction has to be controlled by external cooling. After maintaining the temperature of 130° C. for 30 minutes, 250 ml of 1N hydrochloric acid are added dropwise in the course of 20 minutes, in which process the temperature stabilised at approximately 90° C. The brown emulsion is stirred for a further 1.5 hours at this temperature and is then rendered alkaline with 100 ml of concentrated sodium hydroxide solution. Ethyl acetate is added to the resultant suspension and the latter is filtered. The organic phase is separated off, active carbon is added to it and it is stirred for 1 hour at room temperature. After filtering and evaporating down, 23 g of 6-diethylamino-3-methylindole is obtained in the form of a brown oil.

c) A solution of 50 ml of triethyl orthoformate, 0.95 g of toluenesulfonic acid monohydrate and 2.02 g of 6-diethylamino-3-methylindole are stirred for 1 hour at 100° C. After the green suspension has been evaporated down, addition of hexane precipitates the dyestuff of the formula

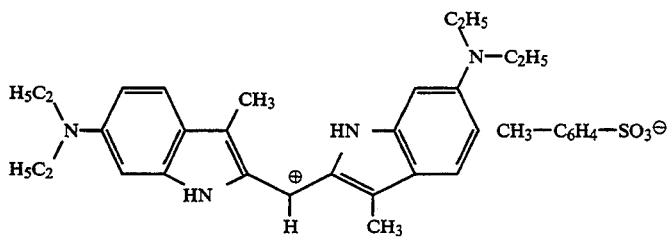

in the form of a green powder which, after drying, melts at more than 330° C.

Example 2: 1.74 g of 6-dimethylamino-3-methylindole are slowly heated to 70° C. in a solution of 25 ml of triethyl orthoformate and 0.5 ml of 100% sulfuric acid and maintained at this temperature for 1.5 hours, in which process crystals with a green lustre precipitate. After 50 ml of acetone have been added, the precipitate is filtered, washed with acetone and dried in vacuo. The dye salt produced in the form of ethyl sulfate melts at more than 330° C. The dye has the formula

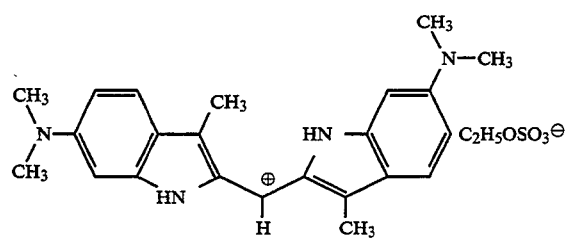

Example 3:

a) 1.74 g of 6-dimethylamino-3-methylindole and 640 mg of benzaldehyde are stirred for 6.5 hours at 45° C. in a mixture of 50 ml of ethanol and 25 ml of glacial acetic acid while flushing with nitrogen. After cooling, 150 ml of water are added and 150 ml of saturated aqueous sodium acetate solution are then added dropwise at 5° C. The suspension is extracted with ethyl acetate, and evaporating the organic solution down leaves behind 1.82 g of a light brown powder which, after recrystallisation from toluene/n-hexane melts from 69° C. upwards and has the following formula:

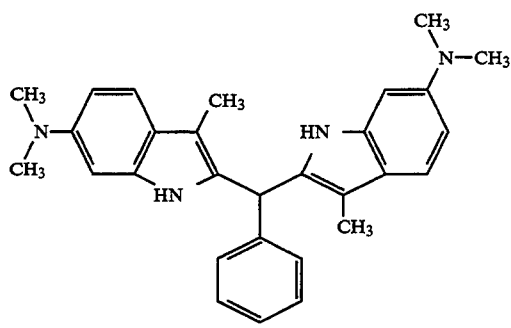

b) 2.75 g of iron trichloride hexahydrate are added to a solution of 40 ml of ethanol, 20 ml of glacial acetic acid and 1.8 g of the bis(6-dimethylamino-3-methylindol-2-yl)phenylmethane obtained as described above and the solution is stirred for 1.5 hours at room temperature. 150 ml of a 10% aqueous solution of sodium perchlorate is then added dropwise at room temperature in the course of 30 minutes, in which process the dyestuff, which is washed with a little water and dried in vacuo, is precipitated. The green crystals obtained melt at more than 320° C.

The dyestuff has the formula

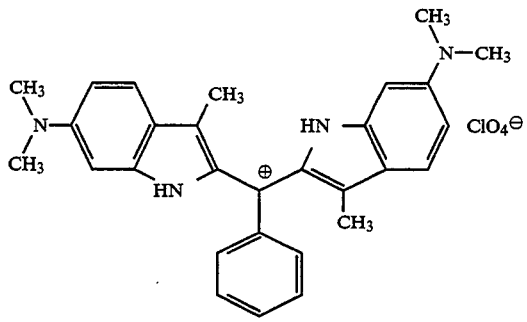

Example 4:

a) 1.74 g of 6-dimethylamino-3-methylindole are reacted with 0.76 g of 4-nitrobenzaldehyde as described in Example 3a, 2.1 g of brown crystals being isolated which melt at from 225° C. upwards while undergoing decomposition and have the following formula:

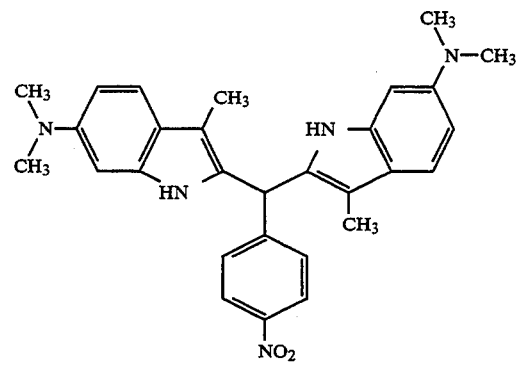

b) 1.06 g of the bis(6-dimethylamino-3-methylindol-2-yl)-4-nitrophenylmethane obtained as described above are dissolved in 75 ml of 0.1N hydrochloric acid at room temperature and oxidised with 1.8 g of iron trichloride hexahydrate. 75 ml of water are added to the deep-blue solution and the latter is stirred for a further 2 hours at room temperature. 10 ml of a 10% aqueous sodium perchlorate solution is then added and the crystalline precipitate which deposits is filtered off. Washing with a little water and drying in vacuo leaves behind 1 g of dark-green crystals which melt at more than 320° C. The dyestuff has the formula:

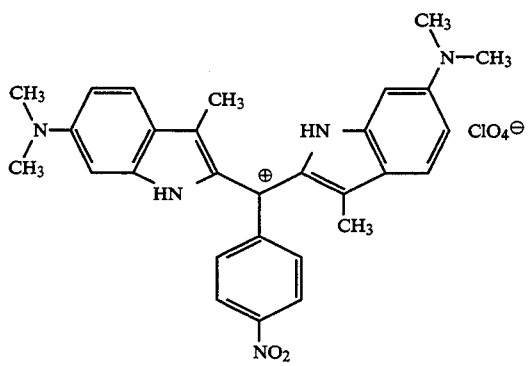

Example 5:

a) 1.74 g of 6-dimethylamino-3-methylindole are reacted with 0.75 g of 4-dimethylaminobenzaldehyde as described in Example 3, and, after recrystallisation from isopropanol, 1.79 g of white crysals are produced which melt at 240° C. upwards while undergoing decomposition. They have the formula:

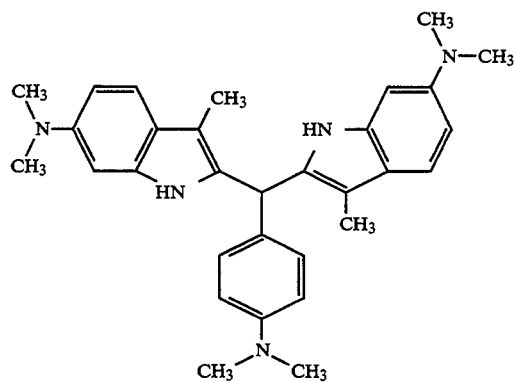

b) 0.95 g of the bis(6-dimethylamino-3-methylindol-2-yl)-4-dimethylaminophenylmethane are oxidised by means of 1.65 g of iron trichloride hexahydrate as described in Example 4b), 0.52 g of deep-blue crystals having a melting point of >320° C. being isolated. They have the formula

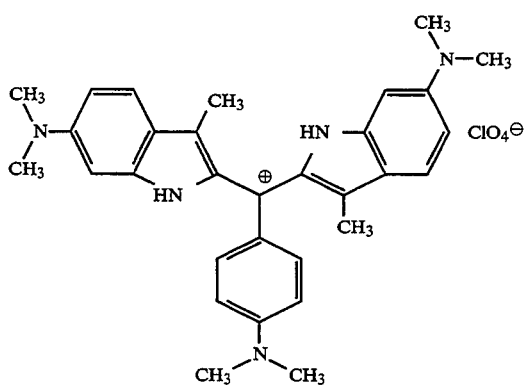

Example 6: 1.74 g of 6-dimethylamino-3-methylindole and 0.67 g of 4-hydroxylbenzaldehyde are stirred for 4 hours at 40° C. in a mixture of 40 ml of ethanol and 20 ml of glacial acetic acid. Oxidation is then carried out for 1 hour at room temperature using 2.75 g of iron trichloride hexahydrate. 250 ml of a saturated sodium acetate solution is now allowed to flow in in the course of 30 minutes, in which process the produce precipitates and can be filtered in an amount of 1.72 g. After recrystalisation from methanol and polishing with active carbon, the blue crystals melt at more than 320° C.

The dye of the formula

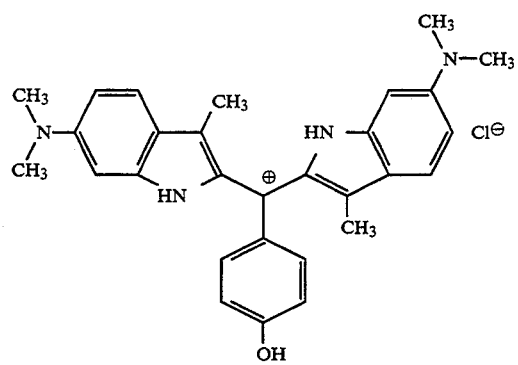

is obtained from the latter by acidification with HCl.

Examples 7 to 11: The following dyes can also be produced by the procedure described in Example 1:

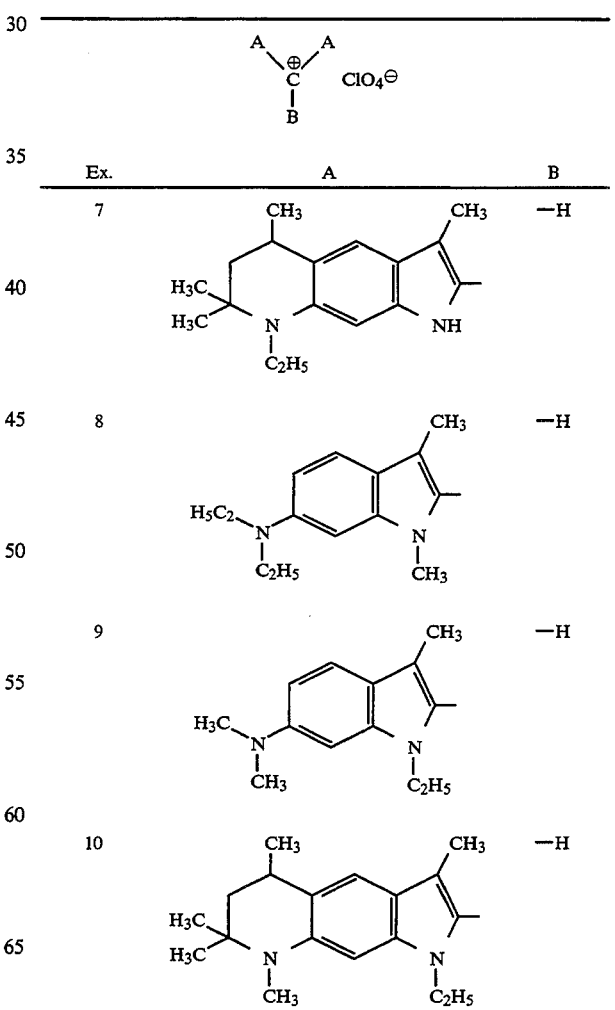

-continued
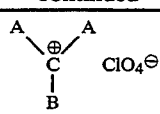
| Ex. | A | B |
|---|---|---|
| 11 | 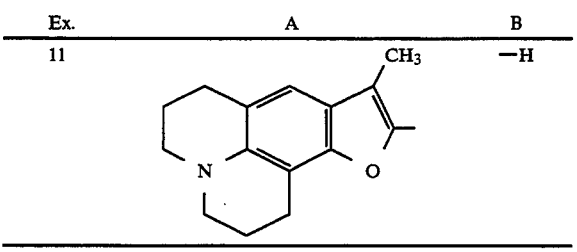 | —H |
Examples 12 to 28: The following dyes can also be produced by the procedure described in Example 3:
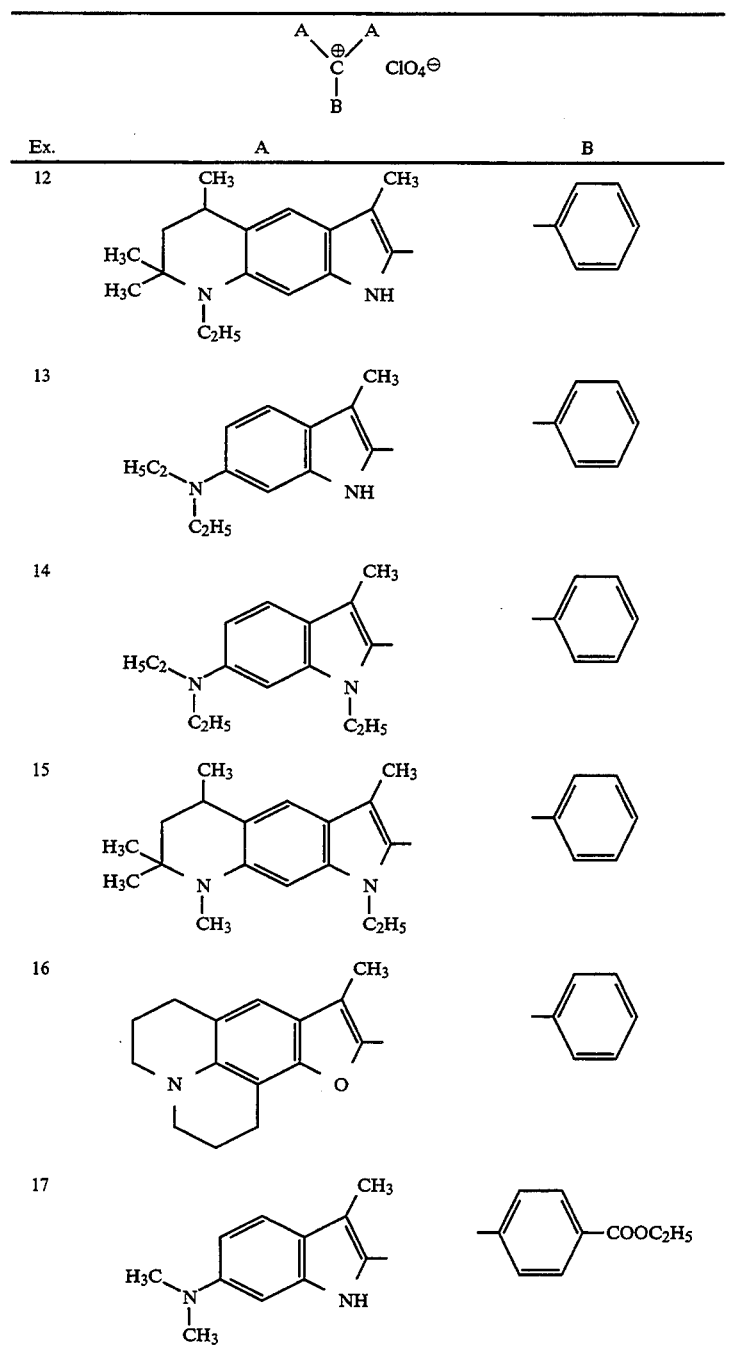

-continued

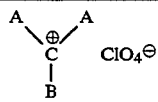

| Ex. | A | B |
|---|---|---|
| 18 | 6-(N,N-diethylamino)-3-methylindol-2-yl | 4-(ethoxycarbonyl)phenyl |
| 19 | 1-ethyl-2,2,4-trimethyl-1,2,3,4-tetrahydroquinoline fused 3-methylindol-2-yl (NH) | 4-(ethoxycarbonyl)phenyl |
| 20 | 1-ethyl-2,2,4-trimethyl-1,2,3,4-tetrahydroquinoline fused 1-ethyl-3-methylindol-2-yl | 4-(ethoxycarbonyl)phenyl |
| 21 | 6-(N,N-dimethylamino)-3-methylindol-2-yl | 2-furyl |
| 22 | 6-(N,N-diethylamino)-3-methylindol-2-yl | 2-furyl |
| 23 | 6-(N,N-dimethylamino)-3-methylindol-2-yl | 4-pyridyl |
| 24 | 6-(N,N-diethylamino)-3-methylindol-2-yl | 4-pyridyl |
| 25 | 1-ethyl-2,2,4-trimethyl-1,2,3,4-tetrahydroquinoline fused 3-methylindol-2-yl (NH) | 4-pyridyl |

-continued

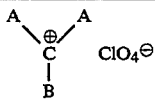

| Ex. | A | B |
|---|---|---|
| 26 | H3C-N(CH3)-[benzene]-C(CH3)=C-NH- | pyridyl |
| 27 | H5C2-N(C2H5)-[benzene]-C(CH3)=C-NH- | pyridyl |
| 28 | tetrahydroquinoline with CH3, CH3, N-C2H5 fused to indole CH3, NH | pyridyl |

B) Application Examples.

Example 29: Preparation of an optical recording material 2% by weight of the compound according to Example 2 are dissolved in 2,2,3,3-tetrafluoro-1-propanol and then filtered using a 0.2 μm Teflon filter. The dye solution is applied by spin-coating under cleanroom conditions at 150 rev/min to a 1.2 mm thick polycarbonte plate (thickness 1.2 mm) and the excess is removed at 1500 rev/min. A uniform dye layer is obtained which, after drying, has a thickness of 0.098 μm. A 0.06 μm thick reflective gold layer is deposited on the dye layer in a vacuum vaporisation apparatus and the gold layer is coated, by the spinning method, with a photopolymer (RENGOLUX® RZ 3203/001) which is cured with UV radiation. This protective layer is 3.1 μm thick. The recording material has a basic reflectivity of 17% at a write wavelength of 780 nm. Bits are written into the recording layer using an argon-pumped titanium/sapphire laser at 780 nm having an output of 6 mW (beam diameter approximately 1.0 μm, pulse duration 0.4 μs). The local change in reflection is 100%; after writing-in, the reflectivity has consequently increased to 34%. On reading the bits out, an excellent signal/noise ratio is found.

Example 30: The procedure is as in Example 29 and a glass base is used. The bits are written in at a laser wavelength of 830 nm (sensitivity greater than 2 nJ/bit). The bits are read out using a continuous beam of the same wavelength at 0.1 mW.

Example 31: The recording material prepared as in Example 29 is measured spectroellipsometrically to determine the optical constants. A refractive index of n=2.2 is found in the region of the recording wavelength of 780 and 830 nm, and an absorption coefficient of k=0.9 in the wavelength region from 500 to 900 nm.

What is claimed is:

1. A compound of the formula (III)

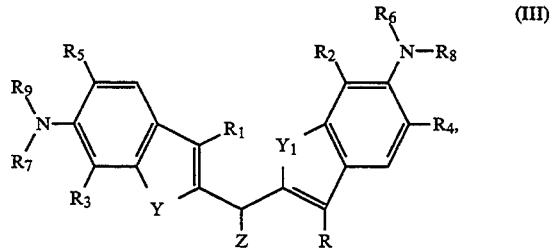

in which

Y and $Y_1$ are the same substituent selected form the group consisting of NH or N-alkyl, N-cycloalkyl, N-phenyl and N-benzyl, R and $R_1$ are each, independently of one another, H, alkyl, cycloalkyl, aralkyl or aryl, $R_2$ is H or forms a 5 or 6 membered ring together with $R_6$ an the N and C atoms linking them, $R_3$ is H or forms a 5 or 6 membered ring together with $R_7$ an the N and C atoms linking them, $R_4$ is H or forms a 5 or 6 membered ring together with $R_8$ an the N and C atoms linking them, $R_5$ is H or forms a 5 or 6 membered ring together with $R_9$ an the N and C atoms linking them, wherein $R_2$ and $R_3$ are the same and $R_4$ and $R_5$ are the same, $R_6$, $R_7$, $R_8$ and $R_9$ are each, independently of one another, H, alkyl, cycloalkyl, aralkyl or aryl, or $R_6$ and $R_8$ and/or $R_7$ and $R_9$ form, together with the N atom linking them, a piperidine radical, a morpholine radical or an unsubstituted piperazine radical or a piperazine radical substituted on the N atom by $C_1$-$C_4$alkyl, hydroxyl-$C_1$-$C_4$alkyl or amino-$C_1$-$C_4$alkyl, Z is H or a substituted or unsubstituted phenyl, naphthyl, pyridyl, furyl, thienyl or pyrrolyl raidcal, and, the alkyl or cycloalkyl being unsubstituted or substituted by halogen, hydroxyl, $C_1$-$C_4$alkoxy, cyano or phenyl, and the aryl or aralkyl being unsubstituted or substituted by halogen, hydroxyl, NH-alkyl, N(alkyl)$_2$, $C_1$-$C_6$alkyl, $C_1$-$C_4$alkoxy, carboxyl, alkoxycarbonyl, carbonamido, mono- or dialkylcarbonamido, nitro or CN.

2. A compound according to claim 1, in which R and $R_1$ are methyl.

3. A compound according to claim 1, in which $R_2$ and $R_3$ are each, independently of one another, H and in which $R_2$ together with $R_6$ or $R_3$ together with $R_7$ are trimethylene.

4. A compound according to claim 1, in which $R_4$ and $R_5$ are each, independently of one another, H or in which $R_4$ together with $R_8$ and $R_5$ together with $R_9$ are 1,1-dimethyl-3-methyltrimethylene.

5. A compound according to claim 1, in which $R_6$, $R_7$, $R_8$ and $R_9$ are each, independently of one another, H, $C_1$-$C_4$alkyl or a substituted or unsubstituted phenyl.

6. A compound according to claim 1, in which Y and $Y_1$ are each, independently of one another, NH or NH-$C_1$-$C_4$alkyl.

7. A compound according to claim 1, in which Z is H, unsubstituted pyridyl or furyl, or unsubstituted phenyl or phenyl substituted by nitro, mono- or dialkylamino, hydroxyl, carboxyl or carboalkoxy.

* * * * *